United States Patent
Crosson

(10) Patent No.: US 11,524,194 B2
(45) Date of Patent: Dec. 13, 2022

(54) METHOD AND APPARATUS FOR FIRE PREVENTION IN OPENINGS IN DEMISING WALL

(71) Applicant: Alvin Crosson, Aubrey, TX (US)

(72) Inventor: Alvin Crosson, Aubrey, TX (US)

(*) Notice: Subject to any disclaimer, the term of this patent is extended or adjusted under 35 U.S.C. 154(b) by 381 days.

(21) Appl. No.: 16/676,013

(22) Filed: Nov. 6, 2019

(65) Prior Publication Data

US 2020/0155883 A1 May 21, 2020

Related U.S. Application Data

(60) Provisional application No. 62/769,870, filed on Nov. 20, 2018.

(51) Int. Cl.
*A62C 35/68* (2006.01)
*E04B 1/94* (2006.01)
*F16L 5/04* (2006.01)
*H02G 3/04* (2006.01)

(52) U.S. Cl.
CPC ............... *A62C 35/68* (2013.01); *E04B 1/94* (2013.01); *E04B 1/948* (2013.01); *F16L 5/04* (2013.01); *H02G 3/0412* (2013.01); *E04B 1/947* (2013.01)

(58) Field of Classification Search
CPC ........... A62C 35/65; A62C 35/68; A62C 3/16; H02G 3/22; H02G 3/0412; E04B 1/94; E04B 1/948; E04B 1/947; F16L 5/04
USPC ................................. 52/219, 220.8, 221, 232
See application file for complete search history.

(56) References Cited

U.S. PATENT DOCUMENTS

| | | | | |
|---|---|---|---|---|
| 1,318,717 A * | 10/1919 | Barton | ...... | F16L 5/04 52/220.8 |
| 4,221,092 A * | 9/1980 | Johnson | ...... | F16L 5/04 52/309.7 |
| 4,276,332 A * | 6/1981 | Castle | ...... | A62C 3/16 428/920 |
| 5,263,746 A * | 11/1993 | Cornwall | ...... | F16L 5/10 285/192 |
| 6,725,615 B1 * | 4/2004 | Porter | ...... | F16L 5/04 52/99 |
| 2004/0231880 A1 | 11/2004 | Beele | | |
| 2007/0289235 A1 | 12/2007 | Hansen et al. | | |
| 2008/0020700 A1 * | 1/2008 | Follett | ...... | H05K 7/20718 251/118 |
| 2008/0217043 A1 * | 9/2008 | Schoke | ...... | H02G 3/0412 174/11 OR |
| 2009/0308622 A1 | 12/2009 | Hansen et al. | | |
| 2011/0088917 A1 * | 4/2011 | Lee | ...... | F16L 5/14 169/48 |
| 2012/0097405 A1 * | 4/2012 | Cordts | ...... | F16L 5/04 169/45 |
| 2013/0091789 A1 | 4/2013 | Simon et al. | | |
| 2014/0020315 A1 | 1/2014 | Munzenberger | | |

(Continued)

*Primary Examiner* — Brian E Glessner
*Assistant Examiner* — Adam G Barlow

(57) ABSTRACT

A fire prevention apparatus includes an inner pipe having multiple perforations along a length of the inner pipe. The fire prevention apparatus also includes an outer pipe surrounding the inner pipe, the outer pipe having a slit along a length of the outer pipe. The fire prevention apparatus also includes fire retardant disposed in a gap between the inner pipe and the outer pipe. The outer pipe is configured to compress when a force is applied to the outer pipe, so as to cause the fire retardant to pass through the perforations into the inner pipe.

20 Claims, 7 Drawing Sheets

(56) References Cited

U.S. PATENT DOCUMENTS

| | | |
|---|---|---|
| 2014/0367127 A1 | 12/2014 | Zernach et al. |
| 2016/0178058 A1 | 6/2016 | Munzenberger |
| 2017/0030490 A1 | 2/2017 | Vandertook et al. |
| 2017/0204999 A1 | 7/2017 | Pijpstra et al. |
| 2017/0354836 A1 | 12/2017 | Lopes et al. |
| 2018/0112803 A1* | 4/2018 | Muenzenberger ....... A62C 3/16 |
| 2018/0248301 A1 | 8/2018 | Wang et al. |
| 2020/0347965 A1* | 11/2020 | Simon .................. H02G 3/0412 |

* cited by examiner

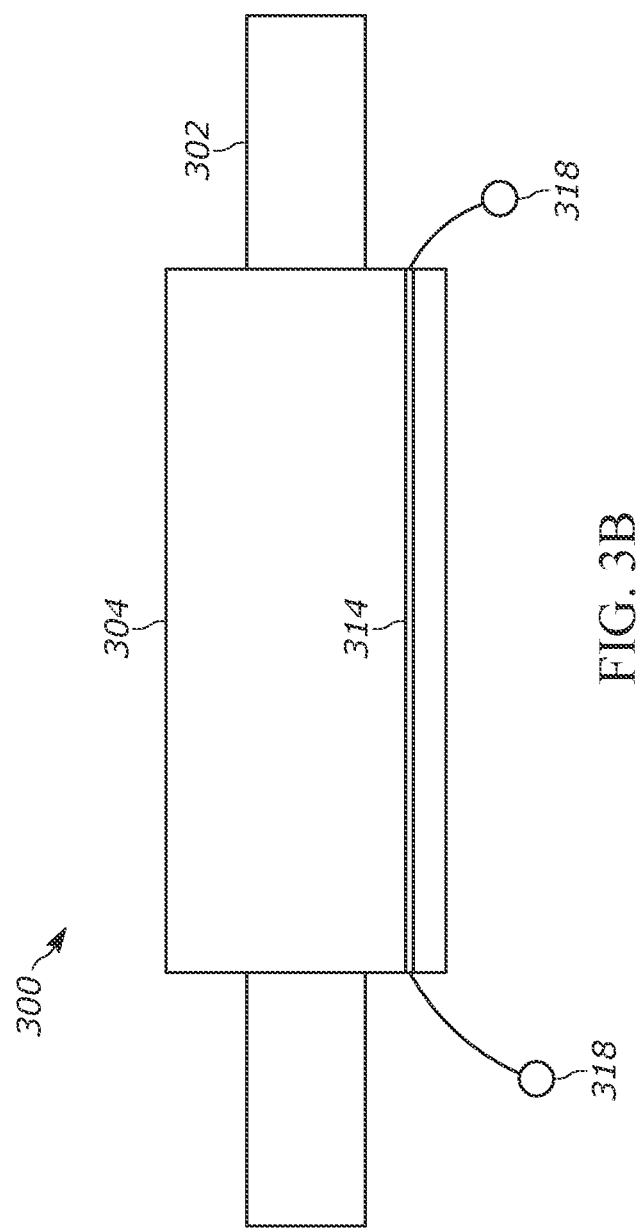

METHOD AND APPARATUS FOR FIRE PREVENTION IN OPENINGS IN DEMISING WALL

CROSS-REFERENCE TO RELATED APPLICATION AND PRIORITY CLAIM

This application claims priority under 35 U.S.C. § 119(e) to U.S. Provisional Patent Application No. 62/769,870 filed on Nov. 20, 2018 and entitled "METHOD AND APPARATUS FOR FIRE PREVENTION IN OPENINGS IN DEMISING WALL," the contents of which are hereby incorporated by reference in their entirety.

TECHNICAL FIELD

This disclosure is generally directed to a method and apparatus for prevention of fires resulting from openings in a demising wall in a building.

BACKGROUND

Many commercial buildings include internal walls that separate one tenant's space from another tenant's space and from common spaces, such as corridors. Such internal walls are referred to as demising walls and are typically constructed with fire prevention or fire retardation features to ensure that a fire in one space does not easily spread to another space. In order to provide services throughout the building, it is often necessary to create one or more openings in a demising wall for service conduits (e.g., wires, pipes, etc.) to pass through. Such openings provide an easier path for fire to spread through the demising wall.

SUMMARY

Embodiments of this disclosure provide a method and apparatus for prevention of fires resulting from openings or penetrations in a demising wall in a building.

In a first embodiment, a fire prevention apparatus includes an inner pipe having multiple perforations along a length of the inner pipe. The fire prevention apparatus also includes an outer pipe surrounding the inner pipe, the outer pipe having a slit along a length of the outer pipe. The fire prevention apparatus also includes fire retardant disposed in a gap between the inner pipe and the outer pipe. The outer pipe is configured to compress when a force is applied to the outer pipe, so as to cause the fire retardant to pass through the perforations into the inner pipe.

In a second embodiment, a fire prevention apparatus includes an inner pipe having multiple perforations along a length of the inner pipe. The fire prevention apparatus also an outer pipe surrounding the inner pipe, the outer pipe having first and second end portions covering a gap between the inner pipe and the outer pipe. The fire prevention apparatus also multiple fittings provided in at least one of the first or second end portions, the fittings configured to connect to a supply of fire retardant for delivery of the fire retardant into the gap between the inner pipe and the outer pipe and through the perforations into the inner pipe.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its features, reference is now made to the following description, taken in conjunction with the accompanying drawings, in which:

FIGS. 3A and 3B illustrate an example fire prevention apparatus according to this disclosure;

DETAILED DESCRIPTION

The figures discussed below and the various embodiments used to describe the principles of the present invention in this patent document are by way of illustration only and should not be construed in any way to limit the scope of this disclosure. Those skilled in the art will understand that the principles of the present invention may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

Figure 1:
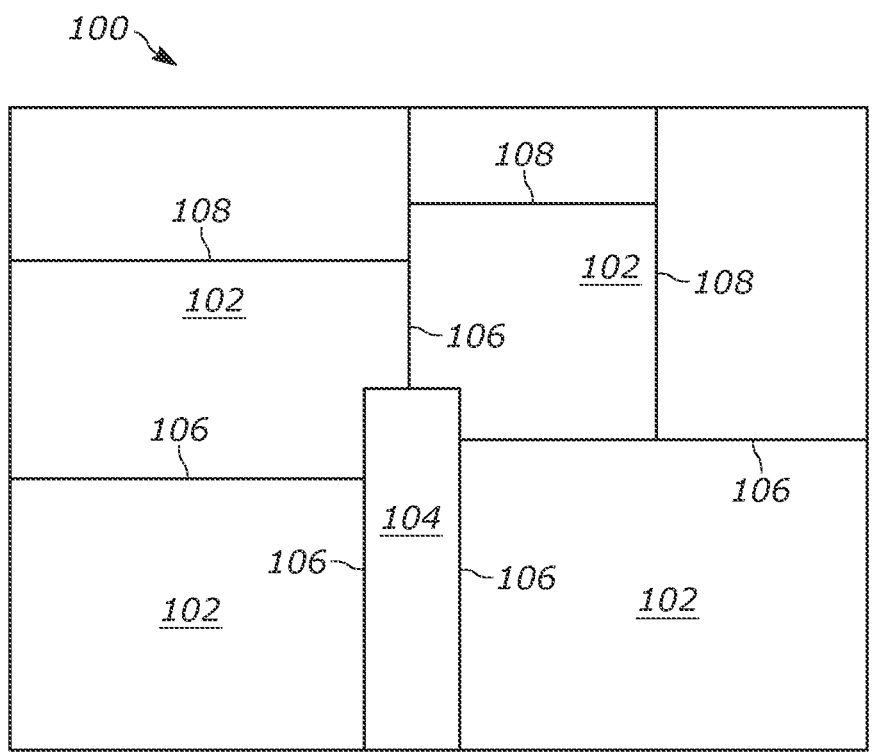
FIG. 1 illustrates an example floor plan of a commercial building according to this disclosure.

FIG. 1 illustrates an example floor plan of a commercial building 100 according to this disclosure. As shown in FIG.

1, the building 100 includes multiple tenant spaces 102 and a common space 104, such as a hallway or corridor. Multiple demising walls 106 are disposed between adjoining tenant spaces 102 and between the tenant spaces 102 and the common space 104. Other walls, such as partition walls 108, define areas or rooms within a tenant space 102.

Figure 2:
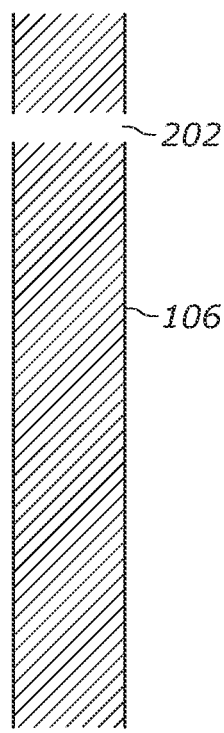
FIG. 2 illustrates a cross section view of a demising wall according to this disclosure.

In order to provide services throughout the building 100, it is necessary to create openings within some of the demising walls. For example, FIG. 2 illustrates a cross section view of a demising wall 106 that has an opening 202 that extends completely through the demising wall 106. One or more service conduits (e.g., wires, pipes, etc.) can be run through the opening 202 and extended to portions of the building 100. Once the service conduits are installed, fire codes require that the opening 202 be sealed with fire caulk or another fire retardant material to prevent or retard a fire. When multiple conduits extend through the opening 202, it can be difficult to coat all sides of each conduit with fire retardant material in order to completely seal the opening 202.

To address these and other issues, embodiments of this disclosure provide an apparatus for fire prevention that can be installed in openings in demising walls. These embodiments are described below. It will be understood that embodiments of this disclosure may include any one, more than one, or all of the features described here. In addition, embodiments of this disclosure may additionally or alternatively include other features not listed here. Some of the following embodiments are described with respect to use with a demising wall of a commercial building. However, such description is not limiting; it will be clear to those of skill in the art that the disclosed embodiments are also applicable in association with other types of walls, buildings, and structures.

Figure 3A:
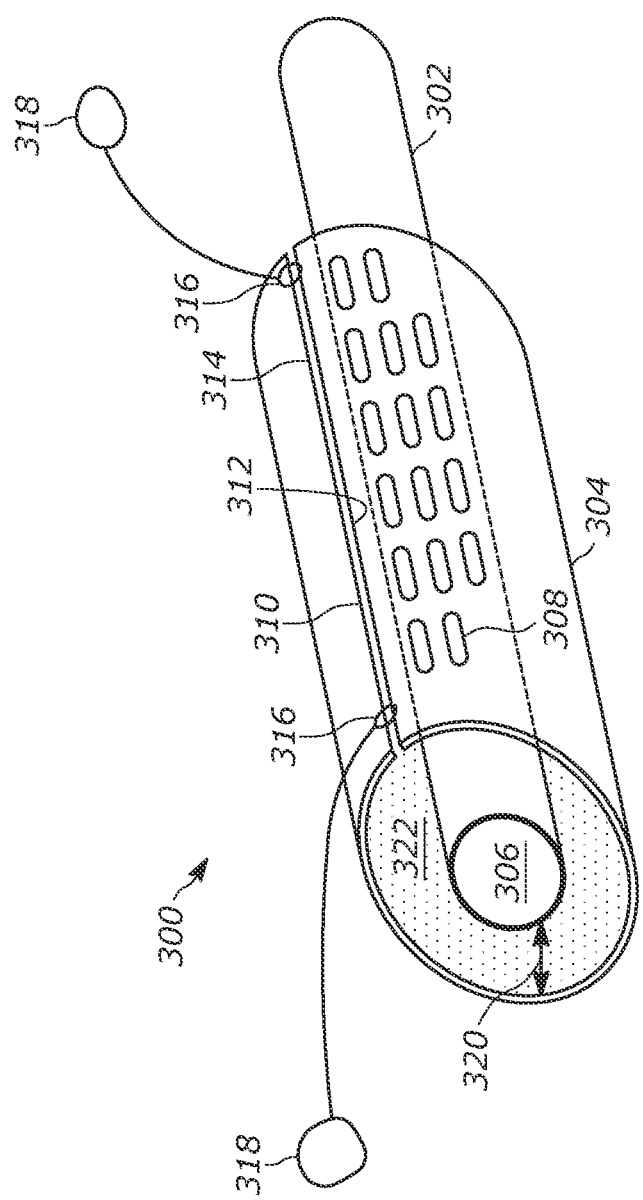

FIGS. 3A and 3B illustrate an example fire prevention apparatus 300 according to this disclosure. FIG. 3A shows a perspective view of the fire prevention apparatus 300, while FIG. 3B shows a side view of the fire prevention apparatus 300. The fire prevention apparatus 300 is configured to be installed in an opening in a demising wall, such as the opening 202 in FIG. 2.

The embodiment of the fire prevention apparatus 300 illustrated in FIGS. 3A and 3B is for illustration only. Other embodiments could be used without departing from the scope of this disclosure. Those skilled in the art will recognize that, for simplicity and clarity, some features and components are not explicitly shown in every figure, including those illustrated in connection with other figures. Such features, including those illustrated in other figures, will be understood to be equally applicable to the fire prevention apparatus 300. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIGS. 3A and 3B, the fire prevention apparatus 300 includes an inner pipe 302 surrounded by an outer pipe 304. Both the inner pipe 302 and the outer pipe 304 are formed of steel, copper, another metal, or another fire resistant material. The pipes 302 may be formed of the same material or formed of different materials.

The inner pipe 302 has a cavity 306 that extends the full length of the inner pipe 302. The inner pipe 302 is used as a conduit in a demising wall, and electrical, data, or communication wiring, smaller plumbing pipes, and the like, are installed through the inner pipe 302. The length and diameter of the inner pipe 302 can be selected based on the application. In some embodiments, the inside diameter of the inner pipe 302 could be ½ inch or ¾ inch for small wiring. In other embodiments, the inside diameter of the inner pipe 302 could be six inches or more for carrying multiple large trunk wires or electrical cables. In some embodiments, the inner pipe 302 is approximately twenty-four inches long. However, the length can be greater or less, depending on the thickness of the demising wall.

As shown in FIG. 3A, the inner pipe 302 has multiple perforations 308 that extend through the wall of the inner pipe 302. The perforations 308 are formed throughout the circumference of the inner pipe 302, but are generally only in a center portion of the length of the inner pipe 302. That is, extending a distance (e.g., about six inches) from either end of the inner pipe 302, there are no perforations 308. Beyond that distance in the middle portion of the length of the inner pipe 302, perforations 308 are disposed circumferentially around the inner pipe 302. In some embodiments, the perforations are elongated ovals oriented parallel to the length of the inner pipe 302. In other embodiments, the perforations 308 are circular, rectangular, or another shape.

The outer pipe 304 is shorter than the inner pipe 302, as shown in FIG. 3B. In some embodiments, the outer pipe 304 is approximately twelve inches long when the inner pipe 302 is twenty-four inches long. Of course, other lengths and differences in lengths are possible and within the scope of this disclosure. The outer pipe 304 is positioned to be substantially centered along the length of the inner pipe 302, such that roughly equal portions of the inner pipe 302 are exposed beyond each end of the outer pipe 304. In particular, the outer pipe 304 covers the perforations in the inner pipe 302, as shown in FIG. 3B.

The outer pipe 304 is generally in the shape of a "broken" cylinder. That is, the outer pipe 304 has two edges 310-312 that form an unsealed seam or slit 314 that extends the length of the outer pipe 304. The edges 310-312 of the outer pipe 304 are held in an aligned position with a securing connection 316, such as one or more tabs or clasps. In other embodiments, the securing connection 316 may be a string or seal that extends the length of the slit 314 and can be pulled away or torn away, similar to a postal envelope with a tear-away opening. Other securing connections are possible and within the scope of this disclosure. In some embodiments, pull tabs 318 are provided at each end to manually release the securing connection 316.

Figure 4:
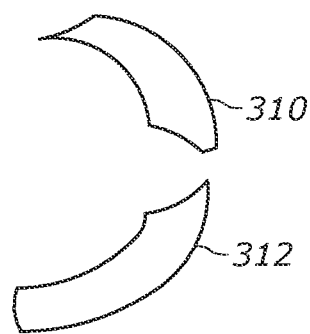
FIG. 4 illustrates beveled or chamfered ends of edges of an outer pipe according to this disclosure.

The outer pipe 304 is constructed to be biased in a state of tension when the slit 314 is closed (when the edges 310-312 are held together), similar to a stretched spring. If the slit 314 is released, the internal forces of the outer pipe 304 act to compress the outer pipe 304 such that one edge 310 slides underneath the other edge 312, thereby creating an overlap. This also acts to reduce the diameter of the outer pipe 304. To facilitate the movement of the edge 310 sliding underneath the edge 312, the ends of the edges 310-312 may be beveled or chamfered as shown in FIG. 4.

The outer pipe 304 has a larger diameter than the inner pipe 302, such that a void or gap 320 exists between walls of the inner pipe 302 and the outer pipe 304. In some embodiments, the gap 320 is about ½ inch or ¾ inch, although it could be smaller or larger depending on the application. As shown in FIG. 3A, the gap 320 between the pipes 302-304 is filled with a fire retardant 322, such as a caulk, paste, foam, or another fire retardant fluid. The fire retardant 322 is viscous enough that it does not flow or seep into the perforations 308 or outside the ends of the outside pipe without mechanical pressure or force.

When the securing connection 316 is released, the internal spring forces in the outer pipe 304 are no longer balanced and the outer pipe 304 starts to collapse on itself, thereby applying inward pressure to the fire retardant 322. The inward pressure causes the fire retardant 322 to seep through the perforations 308 of the inner pipe 302 into the cavity 306 of the inner pipe 302. The outer pipe 304 continues to collapse and the fire retardant 322 continues to enter the cavity 306 until the fire retardant 322 completely (or almost completely) surrounds the internal contents of the inner pipe 302 (wiring, etc.) and completely (or almost completely) fills the cavity 306. At the least, enough fire retardant 322 flows into the cavity 306 of the inner pipe 302 that a fire-retardant seal is produced along at least a portion of the length of the cavity 306, thereby creating a firestop within the inner pipe 302.

In other embodiments, instead of the outer pipe 304 being in a state of tension that causes the outer pipe 304 to collapse under its own forces, the outer pipe 304 could be externally compressed using an external clamping device, screw gun, or another configuration that would apply mechanical inward forces to one or more surfaces of the outer pipe 304.

Because the inner pipe 302 may be of different sizes (depending on the application) and may contain varying numbers of wires or other contents of varying sizes, the amount of fire retardant 322 needed to fill the inner pipe 302 varies depending on the application. Therefore, the amount of fire retardant 322 present in the gap 320, and thus the inner diameter of the outer pipe 304, may be dependent on the size of the inner pipe 302 and the application. In general, the outer pipe 304 is enough larger than the inner pipe 302 that the gap 320 can contain sufficient fire retardant 322 to fill the inner pipe 302 when the outer pipe 304 is fully compressed.

Figure 5:
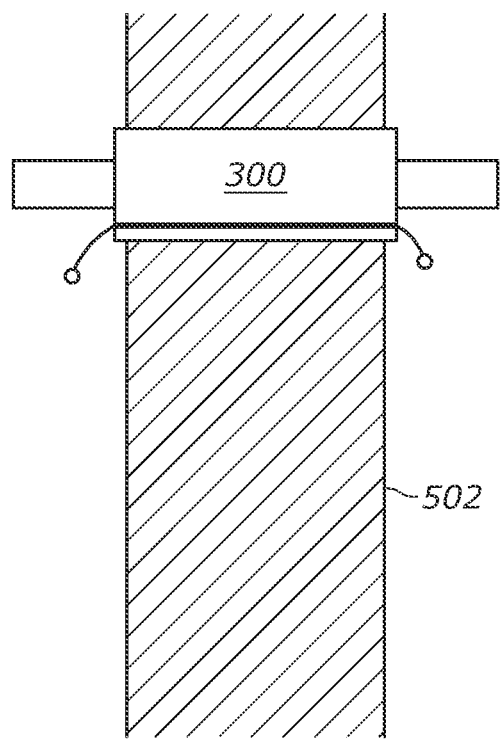
FIG. 5 illustrates an example of a fire prevention apparatus installed in a demising wall according to this disclosure.

FIG. 5 illustrates an example of the fire prevention apparatus 300 installed in a demising wall 502 according to this disclosure. In one aspect of operation, an opening is created in the demising wall 502. The opening is just large enough in diameter for the fire prevention apparatus 300 to fit through. Thus, if the outside diameter of the outer pipe 304 is two inches, the opening in the demising wall 502 may be two inches or just over two inches. The fire prevention apparatus 300 is placed through the wall opening such that opposite ends of the pipes 302-304 are on opposite sides of the demising wall 502. Later, the connection holding the outer pipe 304 together is released, and the outer pipe 304 contracts in diameter, thereby squeezing the fire retardant 322 through the perforations 308 into the inner pipe 302. When pull tabs 318 are used as a release mechanism, the "pulled" pull tabs 318 serve as a visual indicator to an inspector or fire marshal that the inner pipe 302 is sealed. Once the compression is completed, fire caulk can be applied to the outer portions of the wall opening at one or both sides of the wall 502.

Figure 6:
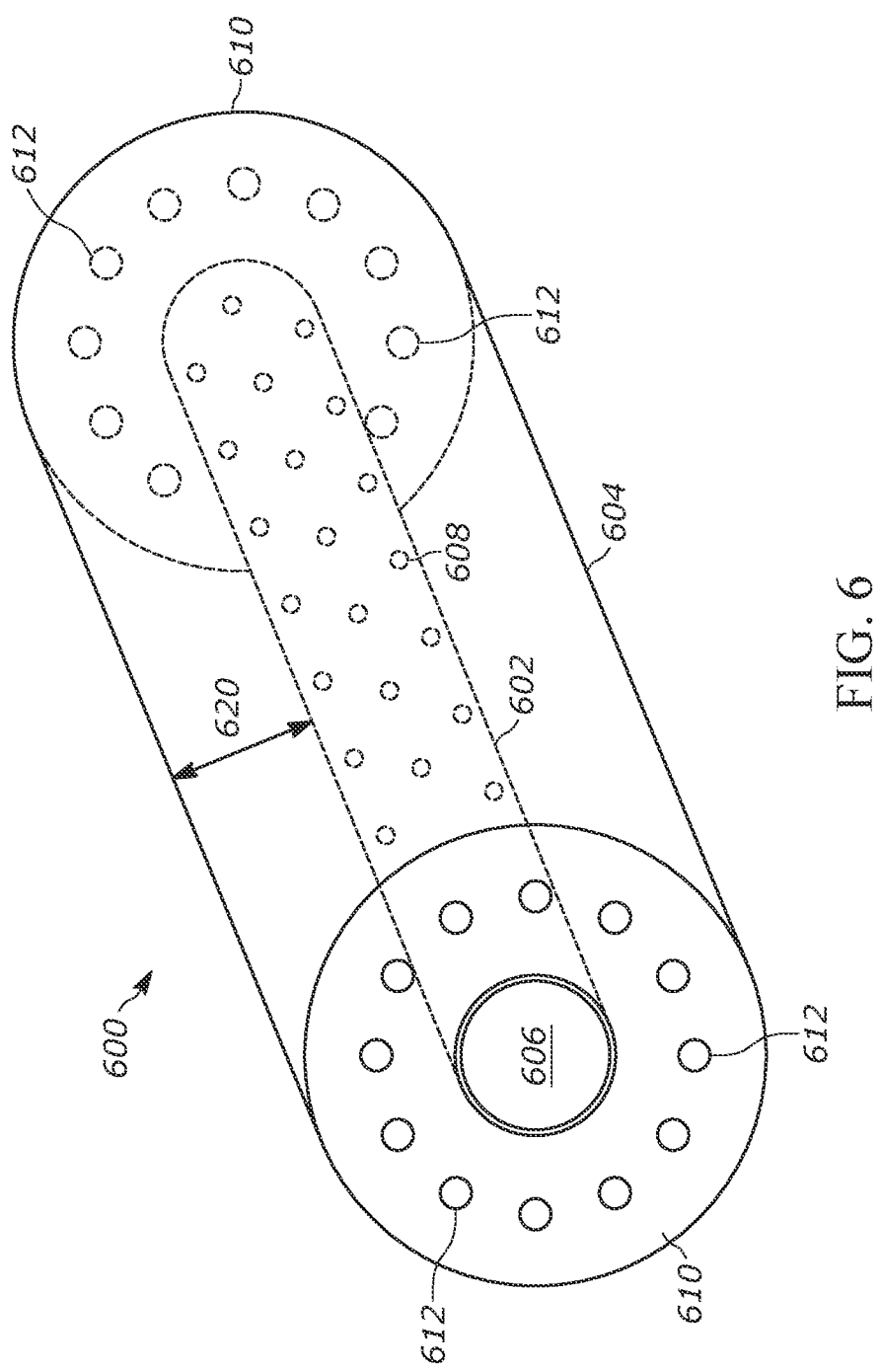
FIG. 6 illustrates another example fire prevention apparatus according to this disclosure.

FIG. 6 illustrates another example fire prevention apparatus 600 according to this disclosure. The fire prevention apparatus 600 is configured to be installed in an opening in a demising wall, such as the opening 202 in FIG. 2.

As shown in FIG. 6, the fire prevention apparatus 600 includes multiple components that are the same as or similar to corresponding components of the fire prevention apparatus 300 of FIGS. 3A and 3B. For example, the fire prevention apparatus 600 includes an inner pipe 602 surrounded by an outer pipe 604. The outer pipe 604 has a larger diameter than the inner pipe 602, such that a gap 620 exists between walls of the inner pipe 602 and the outer pipe 604. The inner pipe 602 has a cavity 606 that extends the full length of the inner pipe 602, and is used as a conduit in a demising wall, through which electrical, data, or communication wiring, smaller plumbing pipes, and the like, are installed. The inner pipe 602 also has multiple perforations 608 that extend through the wall of the inner pipe 602. The perforations 608 are formed throughout the circumference of the inner pipe 602. Further understanding of the elements 602-608 can be gained by reference to the corresponding elements 302-308 of FIGS. 3A and 3B.

Unlike the outer pipe 304 of FIGS. 3A and 3B, the outer pipe 604 does not include a slit along its length. Instead, the outer pipe 604 is continuous (i.e., unbroken) around its circumference. In addition, the outer pipe 604 has end portions 610 that enclose the gap 620 between the inner pipe 602 and the outer pipe 604. One or both end portions 610 include multiple fittings 612 arranged in a circular or other pattern around the cavity 606. In some embodiments, approximately twelve fittings 612 are included on each end portion 610, although the number of fittings could be more or fewer, depending on the suitability to the application.

Each fitting 612 is a metal or plastic fitting to which a retardant delivery gun can be attached to deliver fire retardant (e.g., the fire retardant 322) into the gap 620 using pressure. In some embodiments, the fittings 612 could be similar to a Zerk fitting that is used for delivery of lubricant grease to a motor.

Unlike the fire prevention apparatus 300, when the fire prevention apparatus 600 is first installed in the demising wall, there is no fire retardant within the gap 620. Later, after wiring (or plumbing pipes, etc.) is installed through the inner pipe 602, a retardant delivery gun, having a supply of fire retardant, can be attached to each fitting 612 for insertion of fire retardant into the gap 620. As the gap 620 fills with fire retardant, pressure differences cause some of the fire retardant to seep through the perforations 608 into the cavity 606, thereby surrounding the wiring in the inner pipe 602. The retardant delivery gun can be attached to different ones of the fittings 612 for delivery of fire retardant to different portions of the gap 620 to ensure that the fire retardant is delivered throughout the gap 620 and, by extension, throughout the cavity 606.

Figure 7:
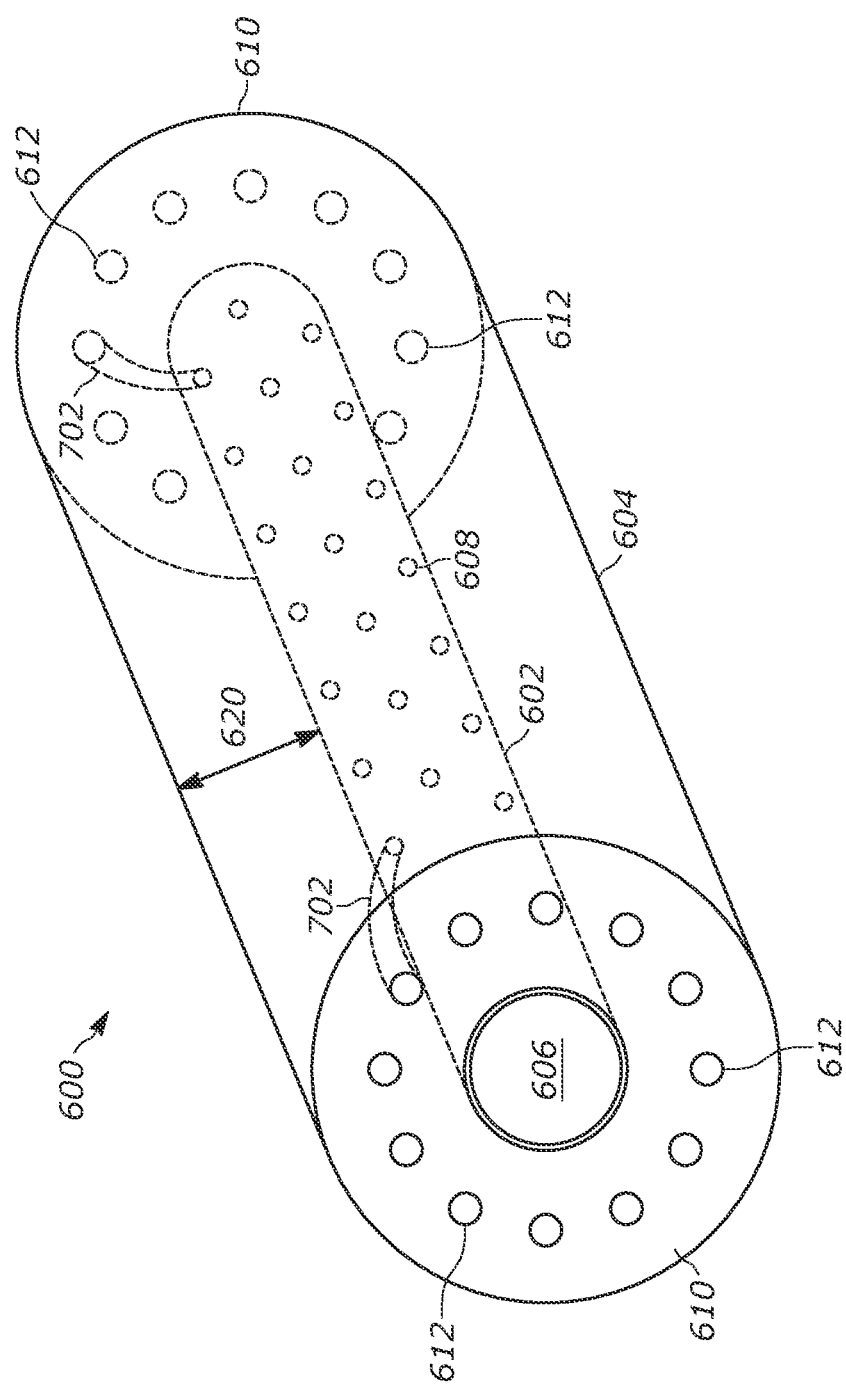
FIG. 7 illustrates an example variation of the fire prevention apparatus of FIG. 6 according to this disclosure.

FIG. 7 illustrates an example variation of the fire prevention apparatus 600 of FIG. 6 according to this disclosure. As shown in FIG. 7, one or more connecting tubes 702 are provided within the gap 620. Each connecting tube 702 is hollow and extends between one of the fittings 612 and one of the perforations 608. In some embodiments, the connecting tubes 702 are formed of flexible plastic or metal (e.g. copper) tubing, although other materials are within the scope of this disclosure. When a retardant delivery gun is attached to a fitting 612 that is coupled to a connecting tube 702, fire retardant is delivered through the fitting 612, the connecting tube 702, and the perforation 608, directly into the cavity 606. This provides a more direct delivery path of fire retardant into the cavity 606. In some embodiments, only one, a couple, or a few of the fittings 612 have corresponding connecting tubes 702. Most of the fittings 612 have an open end on the back side of the end portion 610 for delivery of fire retardant into the gap 620.

Figure 8:
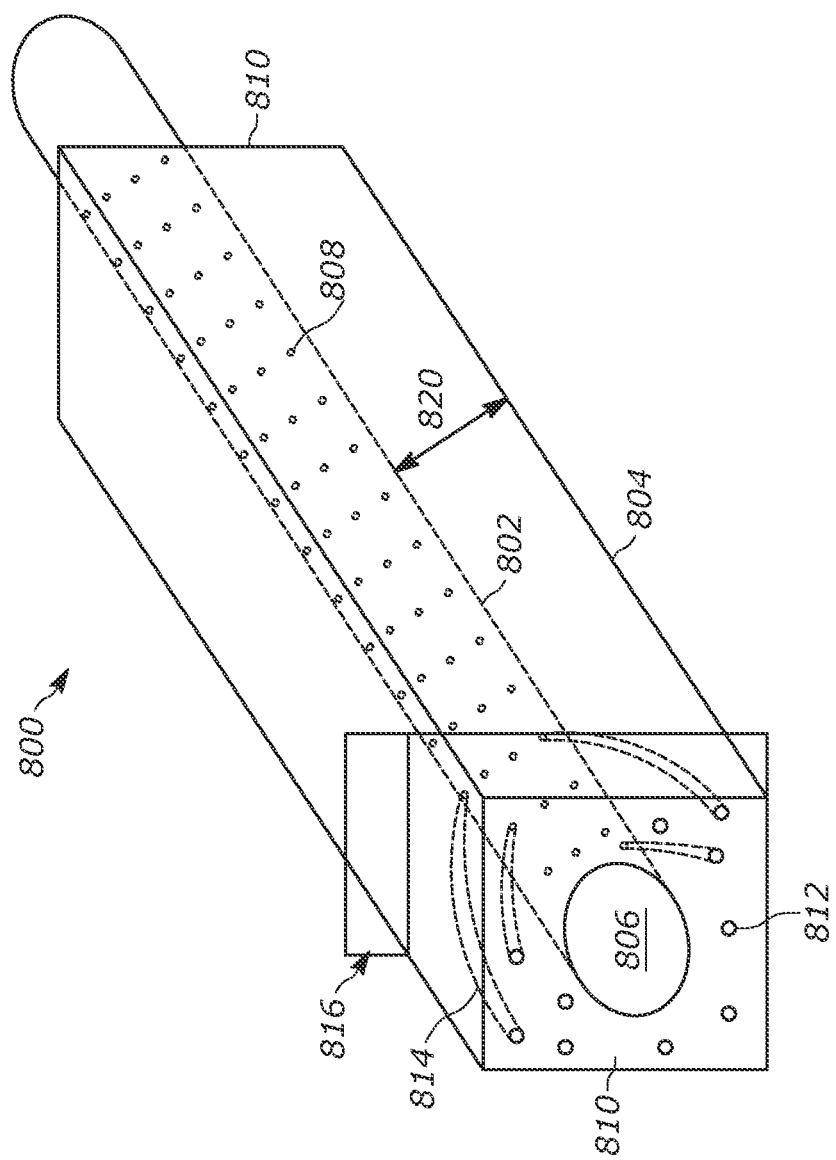
FIG. 8 illustrates another example fire prevention apparatus according to this disclosure.

FIG. 8 illustrates another example fire prevention apparatus 800 according to this disclosure. The fire prevention apparatus 800 is configured to be installed in an opening in a demising wall, such as the opening 202 in FIG. 2.

As shown in FIG. 8, the fire prevention apparatus 800 includes multiple components that are the same as or similar to corresponding components of the fire prevention 600 of FIGS. 6 and 7. For example, the fire prevention apparatus 800 includes an inner pipe 802 surrounded by an outer pipe 804. The outer pipe 804 is larger than the inner pipe 802, such that a gap 820 exists between walls of the inner pipe 802 and the outer pipe 804. The inner pipe 802 has a cavity 806 that extends the full length of the inner pipe 802, and is used as a conduit in the demising wall. The inner pipe 802 has multiple perforations 808 that extend through the wall of the inner pipe 802. The perforations 808 are formed throughout the circumference of the inner pipe 802. In addition, the outer pipe 804 has end portions 810 that enclose the gap 820 between the inner pipe 802 and the outer pipe 804. One or both end portions 810 include multiple fittings 812 arranged in a pattern around the cavity 806. Optionally, the fire prevention apparatus 800 can include one or more connecting tubes 814 that extend between one of the fittings 812 and one of the perforations 808, similar to the connecting tubes 702 of FIG. 7 Further understanding of the elements 802-820 can be gained by reference to the corresponding elements 602-620, 702 of FIGS. 6 and 7.

Unlike cylindrical outer pipe 604 of the fire prevention apparatus 600, the outer pipe 804 is square or rectangular in cross section. The square or rectangular shape of the outer pipe 804 can make it easier to attach or mount the fire prevention apparatus 800 to nearby structural elements, such as a stud or framing element. In addition, in some structures, it can be easier to form a square or rectangular opening through a demising wall than a circular opening, thereby making the square outer pipe 804 advantageous for such an opening. The fire prevention apparatus 800 can also optionally include one or more flanges 816 for attaching the fire prevention apparatus 800 to a surface of the demising wall.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fire prevention apparatus comprising:
    an inner pipe having multiple perforations along a length of the inner pipe;
    an outer pipe surrounding the inner pipe, the outer pipe having a slit along a length of the outer pipe; and
    fire retardant disposed in a gap between the inner pipe and the outer pipe,
    wherein the outer pipe is configured to compress when a force is applied to the outer pipe, so as to cause the fire retardant to pass through the perforations into the inner pipe.

2. The fire prevention apparatus of claim 1, wherein the fire prevention apparatus is configured to be installed in an opening in a demising wall.

3. The fire prevention apparatus of claim 2, wherein the inner pipe comprises a cavity configured to contain at least one of wiring or plumbing that extends through the demising wall.

4. The fire prevention apparatus of claim 1, wherein the inner pipe and the outer pipe are formed of fire resistant material.

5. The fire prevention apparatus of claim 1, wherein the inner pipe is longer than the outer pipe and the perforations of the inner pipe are only on a portion of the length the inner pipe that is covered by the outer pipe.

6. The fire prevention apparatus of claim 1, wherein the slit of the outer pipe is formed by first and second edges of the outer pipe, and the outer pipe is configured to compress by the first edge sliding underneath the second edge.

7. The fire prevention apparatus of claim 6, further comprising a securing connection configured to hold the first and second edges in an aligned position.

8. The fire prevention apparatus of claim 7, wherein the securing connection comprises at least one tab or clasp holding the first and second edges in the aligned position.

9. The fire prevention apparatus of claim 7, wherein the outer pipe is biased in a state of tension such that when the securing connection is released, internal forces of the outer pipe cause the outer pipe to compress.

10. The fire prevention apparatus of claim 1, wherein the force comprises one or more mechanical inward forces applied to one or more surfaces of the outer pipe.

11. A fire prevention apparatus comprising:
    an inner pipe having multiple perforations along a length of the inner pipe;
    an outer pipe surrounding the inner pipe, the outer pipe having first and second end portions covering a gap between the inner pipe and the outer pipe; and
    multiple fittings provided in at least one of the first or second end portions, the fittings configured to connect to a supply of fire retardant for delivery of the fire retardant into the gap between the inner pipe and the outer pipe and through the perforations into the inner pipe.

12. The fire prevention apparatus of claim 11, wherein the fire prevention apparatus is configured to be installed in an opening in a demising wall.

13. The fire prevention apparatus of claim 12, wherein the inner pipe comprises a cavity configured to contain at least one of wiring or plumbing that extends through the demising wall.

14. The fire prevention apparatus of claim 11, wherein the inner pipe and the outer pipe are formed of fire resistant material.

15. The fire prevention apparatus of claim 11, wherein the inner pipe is longer than the outer pipe and the perforations of the inner pipe are only on a portion of the length the inner pipe that is covered by the outer pipe.

16. The fire prevention apparatus of claim 11, wherein the fittings are arranged in a pattern around the inner pipe.

17. The fire prevention apparatus of claim 11, wherein the fittings are provided in the first end portion and are not provided in the second end portion.

18. The fire prevention apparatus of claim 11, wherein the fittings are configured to connect to a retardant delivery gun comprising the supply of fire retardant.

19. The fire prevention apparatus of claim 11, further comprising one or more connecting tubes, each connecting tube extending between one of the fittings and one of the perforations.

20. The fire prevention apparatus of claim 19, wherein the one or more connecting tubes are formed of flexible plastic or metal tubing.

* * * * *